(12) United States Patent
Stavely et al.

(10) Patent No.: US 7,167,201 B2
(45) Date of Patent: Jan. 23, 2007

(54) DEVICE INCORPORATING EYE-START CAPABILITY

(75) Inventors: Donald J. Stavely, Windsor, CO (US); Mark J. Bianchi, Ft. Collins, CO (US); David K. Campbell, Loveland, CO (US); Amy E. Battles, Windsor, CO (US); Heather N. Bean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 351 days.

(21) Appl. No.: 10/424,876

(22) Filed: Apr. 28, 2003

(65) Prior Publication Data

US 2004/0212711 A1   Oct. 28, 2004

(51) Int. Cl.
- H04N 5/222 (2006.01)
- H04N 5/228 (2006.01)
- G03B 17/00 (2006.01)
- G03B 13/02 (2006.01)

(52) U.S. Cl. ............................ 348/333.03; 348/208.16; 396/51; 396/374

(58) Field of Classification Search .................. 348/78, 348/164, 208.16, 208.1, 333.03, 333.01, 348/374; 396/51, 374, 385
See application file for complete search history.

(56) References Cited

U.S. PATENT DOCUMENTS 5,613,166 A    3/1997 Hamada et al.
5,699,115 A  * 12/1997 Hiraki et al. .......... 348/333.13
5,892,985 A  *  4/1999 Matsuyama .................. 348/78
5,909,240 A  *  6/1999 Hori ............................ 348/78
6,055,110 A  *  4/2000 Kintz et al. .................. 359/637
6,388,707 B1 *  5/2002 Suda ....................... 348/333.03
6,538,697 B1 *  3/2003 Honda et al. .......... 348/333.03
6,636,185 B1 * 10/2003 Spitzer et al. .................. 345/8
6,758,563 B1 *  7/2004 Levola ........................ 351/209
6,900,936 B1 *  5/2005 Boyd et al. .................. 359/485
7,091,471 B1 *  8/2006 Wenstrand et al. .......... 250/221
2001/0017604 A1 * 8/2001 Jacobsen et al. .............. 345/27
2002/0003508 A1 * 1/2002 Schehrer et al. .............. 345/7
2002/0033896 A1 * 3/2002 Hatano .................. 348/333.03

FOREIGN PATENT DOCUMENTS

JP       64042639 A  *  2/1989
JP       03192338 A  *  8/1991
JP       07-128579        5/1995
JP       2000-201289      7/2000

OTHER PUBLICATIONS

Translation of Japanese Publ. No. 64-042639.*

* cited by examiner

Primary Examiner—John M. Villecco

(57) ABSTRACT

Disclosed is an eye-start system that includes a light source adapted to be housed within a viewfinder of a device, and a light sensor also adapted to be housed within the device viewfinder, the light sensor being configured to sense light from the light source that reflects off of a user looking into the viewfinder. With this system, light reflected off of the user is sensed by the light sensor and, upon such an occurrence, a device action is activated.

25 Claims, 6 Drawing Sheets

DEVICE INCORPORATING EYE-START CAPABILITY

BACKGROUND

Several devices that include a viewfinder of one form or another incorporate what is commonly referred to in the art as "eye-start" functionality. "Eye-start" refers to the attribute in which an action is initiated upon the detection of the user bringing the viewfinder of the device to his or her face. The term "eye-start" is a bit of a misnomer in that, in the typical case, the presence of the user's face, not his or her eye, is detected by the eye-start sensor. Although the eye-start functionality has various applications, eye-start is most often used in conjunction with film and digital still cameras to activate the autofocusing, autoexposure, and automatic white-balancing processes.

As is known in the art, autofocusing, in which the camera automatically focuses on an object within the camera's field of view, is a relatively time-consuming process in which the one or more lens elements of the camera are moved relative to the camera body until maximum contrast is detected for the object of interest. In most cameras, this process is begun when the user depresses the shutter-release button to a halfway position. Once the autofocusing process has been completed, the focus of the camera remains locked as long as the shutter-release button is maintained in the halfway-depressed position.

Although the halfway depression method works well for experienced users as a means for controlling the autofocusing process, it can fail for less savvy users who do not take the time to permit that process to be completed. For example, when a vacationer asks a stranger to take a picture of the vacationer and his family with his camera, such a stranger may just "poke" the shutter-release button in one swift motion. In such a case, an out-of-focus image may be captured or an incorrect image may be captured (e.g., when the camera is prematurely moved from the intended object).

These problems can be avoided when the eye-start functionality is used. In such a case, the autofocusing mechanism begins to operate as soon as the camera is brought up to the user's face. Therefore, the object of interest typically will be in focus by the time the user wishes to capture an image. The eye-start functionality also provides the added benefit of reducing the perceived time the user must wait for the camera to focus on the object. Specifically, once the camera has been brought up to the face and the user has composed the shot, the user may take the picture at will without having to depress the shutter-release button to a halfway position and hold it there until the autofocusing process is completed.

While eye-start can be an attractive feature in a camera or other device, conventional eye-start mechanisms can potentially make false determinations as to the proximity of the user's face. This is because most eye-start mechanisms comprise a light source and light sensor that are positioned external to the device viewfinder, for instance adjacent the viewfinder on a rear panel of the device housing. Therefore, if a camera with eye-start functionality is set down on a table next to another object, the camera can be "fooled" into believing the viewfinder has been brought up to the user's eye, and therefore may initiate the autofocusing process or other designated action. Such unintended operation is undesirable especially when it wastes power thereby shortening battery life.

SUMMARY

Disclosed is an eye-start system that comprises a light source adapted to be housed within a viewfinder of a device, and a light sensor also adapted to be housed within the device viewfinder, the light sensor being configured to sense light from the light source that reflects off of a user looking into the viewfinder. With this system, light reflected off of the user is sensed by the light sensor and, upon such an occurrence, a device action is activated.

DETAILED DESCRIPTION

As identified in the foregoing, devices that incorporate conventional eye-start mechanisms can be activated by stimulus other than proximity of a user's face. Therefore, needed are devices that incorporate eye-start functionality but which more accurately detect when the user has brought a viewfinder up to his or her eye.

Disclosed herein is a device that integrates eye-start functionality within a viewfinder of the device. In some cases, the components already used to provide images to the user in the viewfinder are leveraged to make determinations as to whether the user has in fact placed the viewfinder up to his or her eye.

Figure 1:
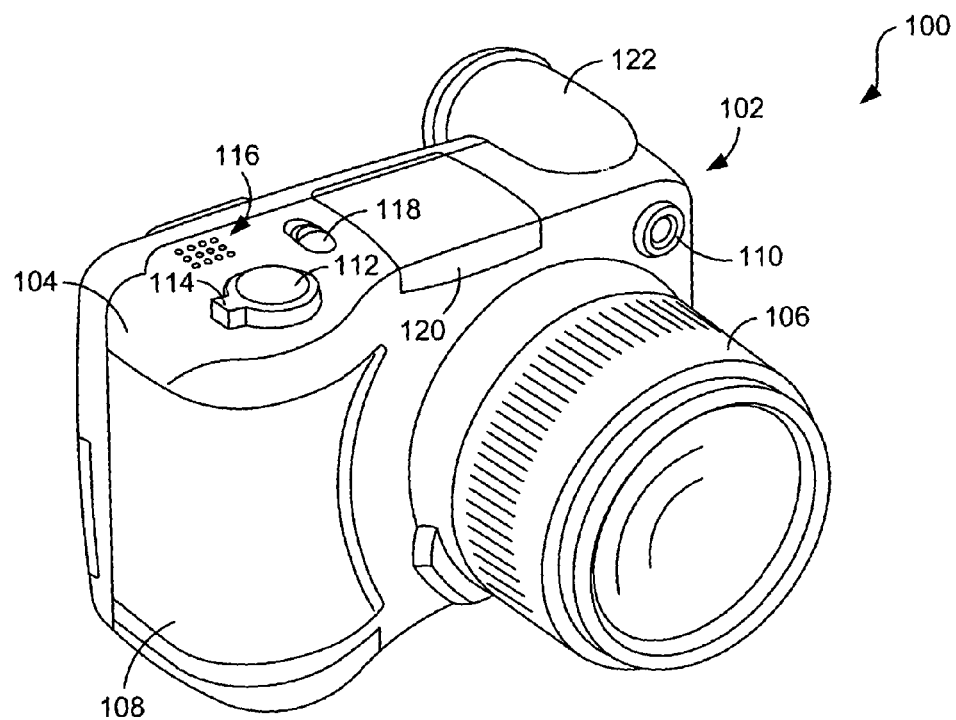
FIG. 1 is a front perspective view of an embodiment of a device that includes eye-start functionality.

Referring now to the drawings, in which like numerals indicate corresponding parts throughout the several views, FIG. 1 illustrates an embodiment of a device 100 that incorporates an eye-start system which is integrated into a device viewfinder. As indicated in the figure, the device 100 can comprise a camera and, more particularly, a digital still camera. Although a camera implementation is shown in the figures and described herein, it is to be understood that a camera is merely representative of one of many different devices that can incorporate the eye-start system. Therefore, the eye-start system described in the following can, alternatively, be used in such devices as video cameras, virtual reality glasses, portable computing devices, and the like. Indeed, the eye-start system can be used with substantially any device that includes a viewfinder.

As indicated in FIG. 1, the device 100, which from this point forward will be referred to as "camera 100," includes a body 102 that is encapsulated by an outer housing 104. The camera 100 further includes a lens barrel 106 that, by way of example, houses a zoom lens system. Incorporated into the front portion of the camera body 102 is a grip 108 that is used to grasp the camera and a window 110 that, for example, can be used to collect visual information used to automatically set the camera focus, exposure, and white balance.

The top portion of the camera 100 is provided with a shutter-release button 112 that is used to open the camera shutter (not visible in FIG. 1). Surrounding the shutter-release button 112 is a ring control 114 that is used to zoom the lens system in and out depending upon the direction in which the control is urged. Adjacent the shutter-release button 112 is a microphone 116 that may be used to capture audio when the camera 100 is used in a "movie mode." Next to the microphone 116 is a switch 118 that is used to control operation of a pop-up flash 120 (shown in the retracted position) that can be used to illuminate objects in low light conditions.

Figure 2:
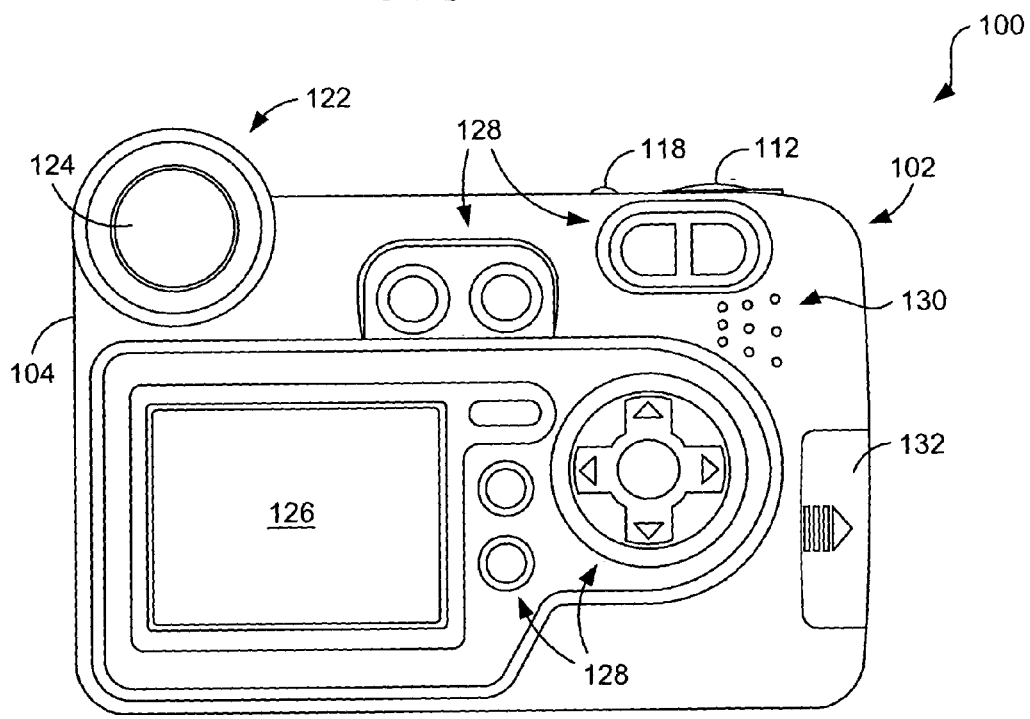
FIG. 2 is a rear view of the device of FIG. 1.

Referring now to FIG. 2, which shows the rear of the camera 100, further provided on the camera body 102 is a viewfinder 122. In a preferred arrangement, the viewfinder 122 comprises an electronic viewfinder (EVF) that incorporates a microdisplay (not visible in FIG. 2) upon which captured images are presented to the user. These images may be viewed by looking through a view window 124 of the viewfinder 122 that, as is described below in greater detail, may comprise a magnifying lens or lens system. Below the viewfinder 122 is a flat panel display 126 that may be used to compose shots and review captured images. By way of example, the display 126 comprises a liquid crystal display (LCD). Various control buttons 128 are also provided on the rear of the camera body 102. These buttons 128 can be used to, for instance, change camera settings, navigate control menus presented to the user in the display 126, and scroll through images shown in the display or the viewfinder 122. The rear of the camera body 102 further includes a speaker 130 that is used to present audible information to the user (e.g., beeps and recorded sound) and a compartment 132 that is used to house a battery and/or a memory card.

Figure 3:
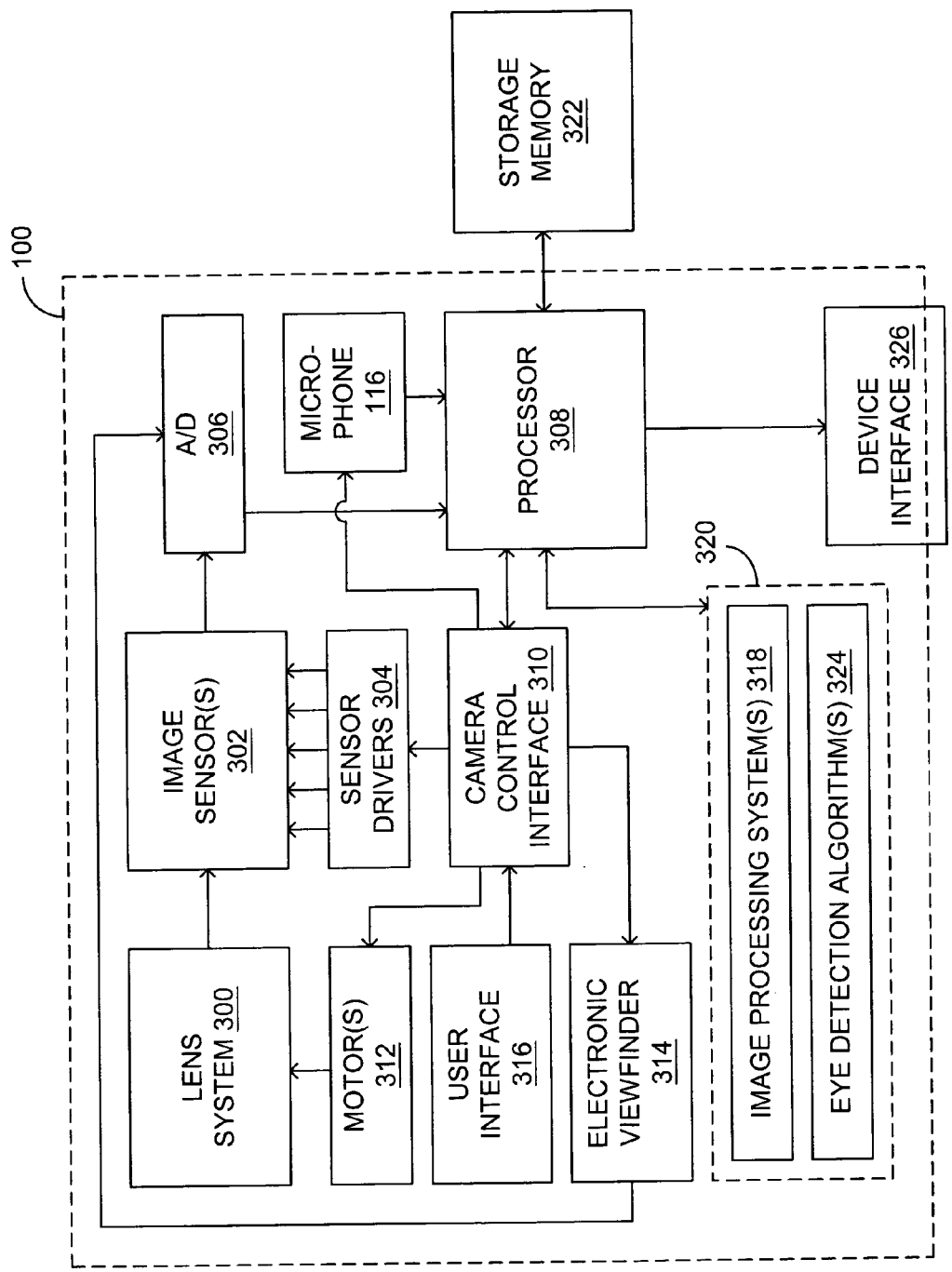
FIG. 3 is an embodiment of a schematic representation of the device shown in FIGS. 1 and 2.

FIG. 3 provides an example architecture for the camera 100. As indicated in this figure, the camera 100 includes a lens system 300 that conveys images of viewed scenes to one or more image sensors 302. By way of example, the image sensors 302 comprise charge-coupled devices (CCDs) that are driven by one or more sensor drivers 304. The analog image signals captured by the sensors 302 are then provided to an analog-to-digital (A/D) converter 306 for conversion into binary code that can be processed by a processor 308.

Operation of the sensor drivers 304 is controlled through a camera control interface 310 that is in bi-directional communication with the processor 308. Also controlled through the interface 310 are one or more motors 312 that are used to drive the lens system 300 (e.g., to adjust focus and zoom), the microphone 116 identified in FIG. 1, and an electronic viewfinder 314, various embodiments of which are described in later figures. Output from the electronic viewfinder 314, like the image sensors 302, is provided to the A/D converter 306 for conversion into digital form prior to processing. Operation of the camera control interface 310 may be adjusted through manipulation of the user interface 316. The user interface 316 comprises the various components used to enter selections and commands into the camera 100 and therefore at least includes the shutter-release button 112, the ring control 114, and the control buttons 128 identified in FIG. 2.

The digital image signals are processed in accordance with instructions from the camera control interface 310 and the image processing system(s) 318 stored in permanent (non-volatile) device memory 320. Processed images may then be stored in storage memory 322, such as that contained within a removable solid-state memory card (e.g., Flash memory card). In addition to the image processing system(s) 318, the device memory 320 further comprises one or more eye detection algorithms 324 (software or firmware) that is/are used in conjunction with the electronic viewfinder 314 to detect when the viewfinder is being held up to the user's eye. Finally, the camera 100 comprises a device interface 326, such as a universal serial bus (USB) connector, that is used to download images from the camera to another device such as a personal computer (PC) or a printer, and which can be likewise used to upload images or other information.

Figure 4:
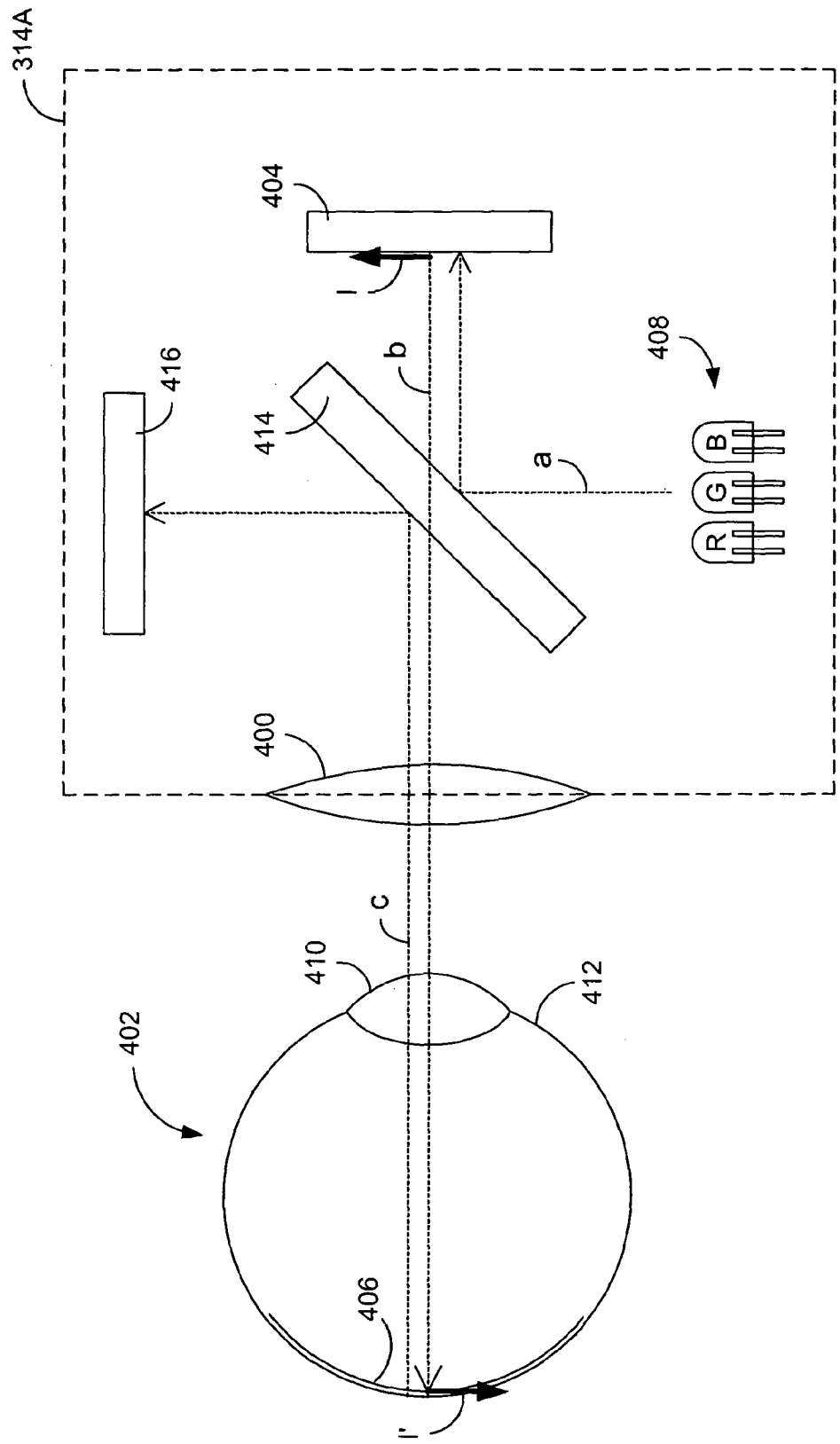
FIG. 4 is a schematic view of a user's eye interacting with a first embodiment of a viewfinder of the device shown in FIGS. 1–3.

FIG. 4 illustrates a first embodiment of an electronic viewfinder 314A that can be incorporated into the camera 100. The viewfinder 314A, as well as the other viewfinders described below, can be formed as an integral viewfinder module that incorporates components of the eye-start system. Accordingly, as will be apparent from the discussions that follow, eye-start systems are integrated with each of the viewfinder embodiments.

As indicated in FIG. 4, the electronic viewfinder 314A includes a magnifying lens 400 which the user places close to his or her eye 402. The magnifying lens 400 is used to magnify and focus images generated with a microdisplay 404 contained within the viewfinder housing. Although element 400 is identified as a single lens in FIG. 4, a suitable system of lenses could be used, if desired. Through the provision of the magnifying lens 400, an image I generated by the microdisplay 404 is transmitted to the user's eye 402 so that a corresponding image I' is focused on the retina 406 of the eye.

The microdisplay 404 can comprise a transmissive or reflective display. For purposes of the present disclosure, the term "microdisplay" refers to any flat panel display having a diagonal dimension of one inch or less. Although relatively small in size, when viewed through magnifying or projection optics, microdisplays provide large, high-resolution virtual images. For instance, a microdisplay having a diagonal dimension of approximately 0.19 inches and having a resolution of 320×240 pixels can produce a virtual image size of approximately 22.4 inches as viewed from 2 meters.

By way of example, the microdisplay 404 comprises a reflective ferroelectric liquid crystal (FLC) microdisplay formed on a silicon die. One such microdisplay is currently available from Displaytech, Inc. of Longmont, Colo. In that such microdisplays reflect instead of emit light, a separate light source is required to generate images with a reflective microdisplay. Therefore, the electronic viewfinder 314A comprises red, green, and blue light sources in the form of light emitting diodes (LEDs) 408. These LEDs 408 are sequentially pulsed at a high frequency (e.g., 90–180 Hz) in a field sequential scheme so that light travels along path "a," reflects off of a beam splitter 414 (e.g., a glass pane or a prism), and impinges upon the microdisplay 404. The various pixels of the microdisplay 404 are manipulated to reflect the light emitted from the LEDs 408 toward the user's eye 402. This manipulation of pixels is synchronized with the pulsing of the LEDs so that the red portions of the image are reflected, followed by the green portions, and so forth in rapid succession. Although a reflective microdisplay is shown in the figure and described herein, the microdisplay could, alternatively, comprise a transmissive or emissive display, such as a small LCD or an organic light emitting diode (OLED), if desired. In such a case, the various LEDs would not be necessary, but in the case of an LCD, a source of white light would be required to back-light the display.

The light reflected (or transmitted or emitted as the case may be) from the microdisplay 404 travels along path "b" toward the user's eye 402. In that the various color signals are transmitted at high frequency, the eye 402 interprets and combines the signals so that they appear to form the colors and shapes that comprise the viewed scene. Due to the characteristics of the eye 402, a portion of this light is reflected back into the viewfinder 314A along the path "c." This light can have been reflected off of various different features of the user's eye 402 including, for example, the retina 406 (which retroreflects light), or the cornea 410 and/or sclera 412 (which reflect "glints" of light). In addition, any light reflected from the user's eyelid and face that is illuminated by the microdisplay 404 may also be reflected along path "c."

The light reflected by the user enters the electric viewfinder 314A through the magnifying lens 400 and is then reflected off of the beam splitter 414. This reflected image then arrives at the eye-start sensor 416 contained within the electric viewfinder housing. The sensor 416 comprises a solid-state sensor such as a CCD. The light signal captured by the sensor 416 is provided, after conversion into a digital signal, to the processor 308 (FIG. 3) and can then be analyzed using the eye detection algorithms 324 stored in device memory 320 so as to make the determination as to whether the user has brought the device eyepiece 122 up to his or her eye. In making this determination, the eye detection algorithms 324 are used to identify gross quantities of light to determine if the level of light, i.e., brightness of the light signal, exceeds a predetermined minimum threshold. This minimum threshold can be programmed into memory 320 at the time of manufacture or can be determined through a calibration process in which the user holds the viewfinder 314A up to his or her eye and communicates this condition to the camera 100. If the threshold is set correctly, light reflected from the microdisplay 404 when the camera 100 is not held up to the face or light from the environment will fail trigger the eye-start system.

Figure 5:
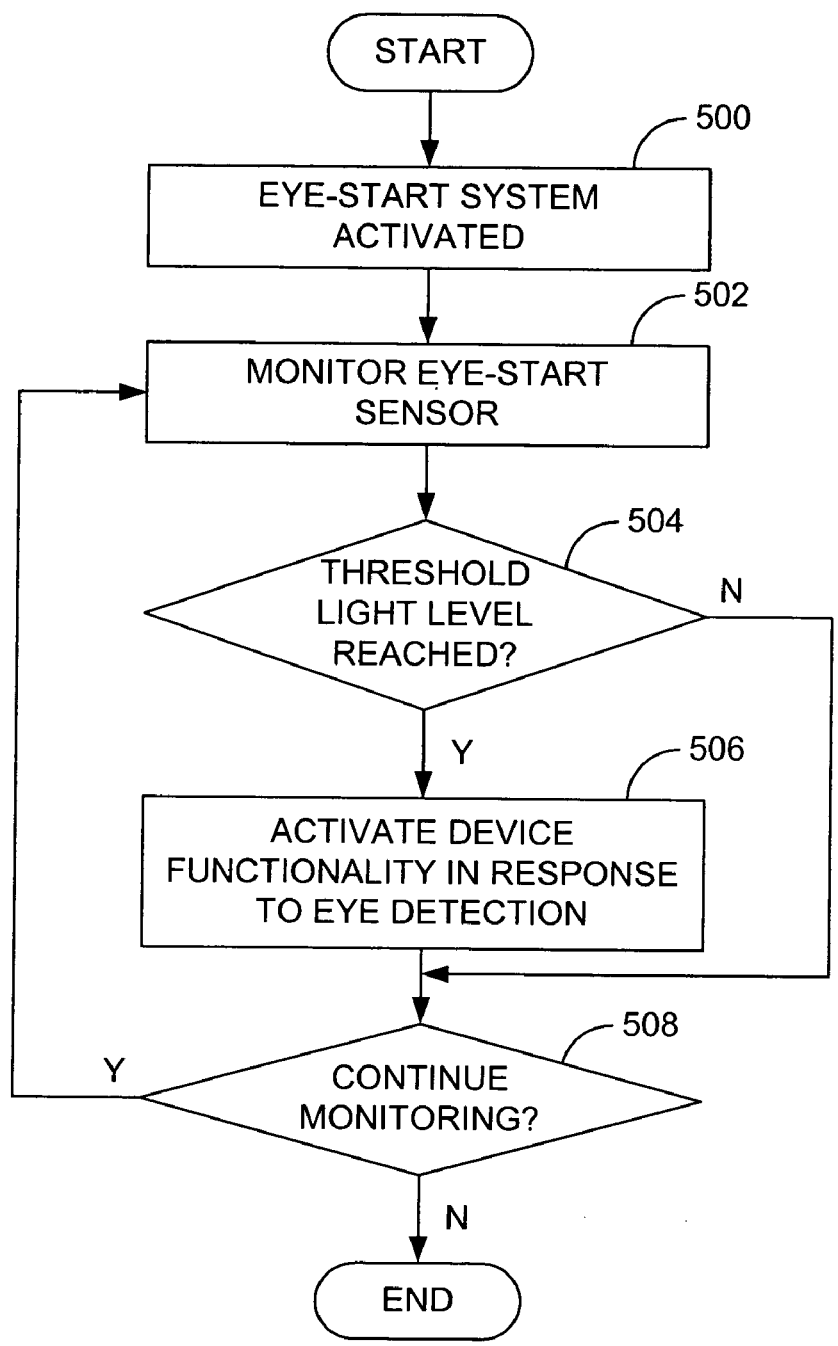
FIG. 5 is a flow diagram of an embodiment of operation of the camera providing eye-start functionality.

FIG. 5 is a flow chart that summarizes the eye-start functionality mentioned above in the description of the viewfinder 314A. Any process steps or blocks described below may represent modules, segments, or portions of program code that includes one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Beginning with block 500 of this figure, the eye-start system is activated. This activation may occur in response to the device 100 being turned on, or due to another stimulus such as an eye-start mode being selected by the user with the user interface 316. In any case, once the eye-start system has been activated, it continually monitors the amount of light sensed by the eye-start sensor 416, as indicated in block 502, to determine whether the magnitude of the sensed light exceeds the threshold value so as to signal a positive eye proximity determination. By way of example, the eye-start system can monitor the sensor 416 with a frequency of about 1–10 Hz.

With reference to decision block 504, it is determined whether the light level, i.e., brightness, of the light incident on the eye-start sensor 416 exceeds the predetermined threshold. If not, flow continues down to decision block 508 described below. If the threshold is met or exceeded, however, flow continues to block 506 at which a device functionality is activated. Where the device is a camera, this functionality can be one or more of initiating autofocusing, autoexposure, and automatic white-balancing. Other non-photographic functionalities may also be controlled. For instance, the microdisplay 404 or the device itself can be activated upon detection of the user's eye. In fact, the eye detection method described herein can be used to activate nearly any functionality or operation of substantially any device that incorporates a viewfinder whether it be an electric or conventional viewfinder.

Figure 6:
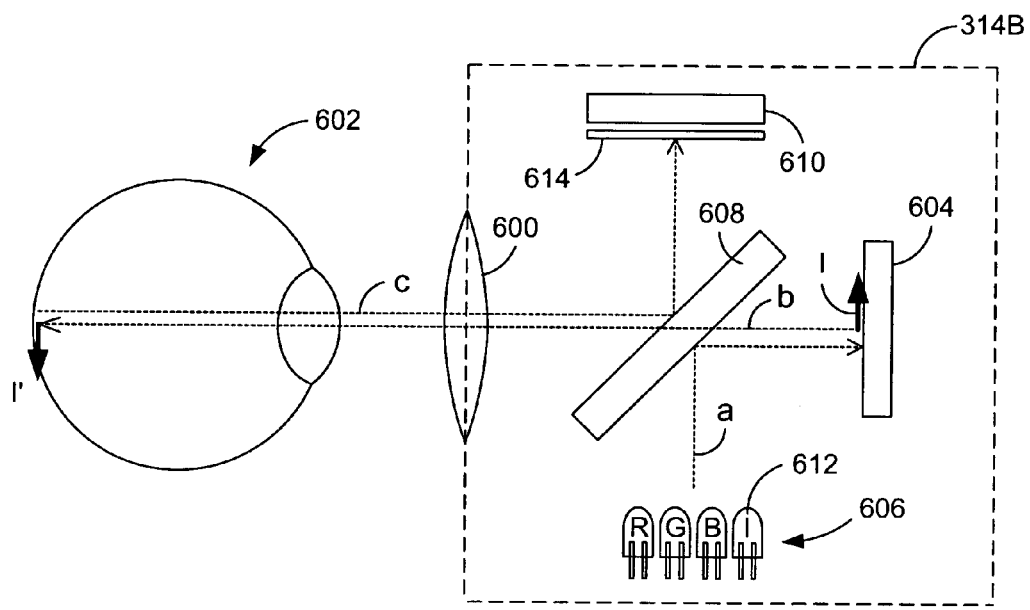
FIG. 6 is a schematic view of a user's eye interacting with a second embodiment of a viewfinder of the device shown in FIGS. 1–3.

FIG. 6 illustrates a second embodiment of an electronic viewfinder 314B that can be incorporated into the camera 100. The viewfinder 314B is similar in some respects to the viewfinder 314A of FIG. 4. Therefore, the viewfinder 314B includes a magnifying lens 600 that is brought near the user's eye 602, a microdisplay 604, a group of LEDs 606, a beam splitter 608, and an eye-start sensor 610. In addition, however, the viewfinder 314B includes an infrared (IR) LED 612 that is used to generate IR wavelength light that is used to illuminate the user's eye 602, and an IR-pass filter 614 that is used to filter visible light before it reaches the eye-start sensor 610. With these additional components, the user's eye 602 can be flooded in IR light and the reflected IR signals can be detected by the sensor 610. Specifically, IR light travels from the IR LED 612 along path "a," reflects off of the beam splitter 608, reflects off of the microdisplay 604, travels along path "b" through the beam splitter and the magnifying lens 600, reflects off of one or more features of the user's eye 602 and/or surrounding tissue, travels along path "c," reflects off of the beam splitter again, passes through the IR-pass filter 614, and finally is collected by the eye-start sensor 610.

In this embodiment, the IR LED 612 may be pulsed in the same manner as the other LEDs 606 in the field sequential scheme such that, for instance, one out of four reflections from the microdisplay 604 is an IR reflection. Notably, however, in that the user's eye 602 will not detect the presence of the IR signal, the IR LED 612 need not be pulsed only when the other LEDs are off. In fact, if desired, the IR LED 612 can be illuminated continuously until the presence of the user's eye 602 is detected. To prolong battery life, however, the IR LED 612 normally is pulsed on and off at a suitable frequency (e.g., 2 Hz).

The embodiment of FIG. 6 provides a potential advantage in that false readings may occur less frequently in that only IR light will trigger the eye-start system and, therefore, activate a given device functionality. In addition, the use of a separate IR light source may be useful in situations in which the microdisplay 604 falls into a "sleep" mode when the device has not been used for a given period or time or when the images presented in the microdisplay are relatively dim and therefore the signals reflected from the eye 602 may be difficult to detect. Furthermore, the use of IR light may be advantageous when the eye-start functionality is used to power-up the device.

Figure 7:
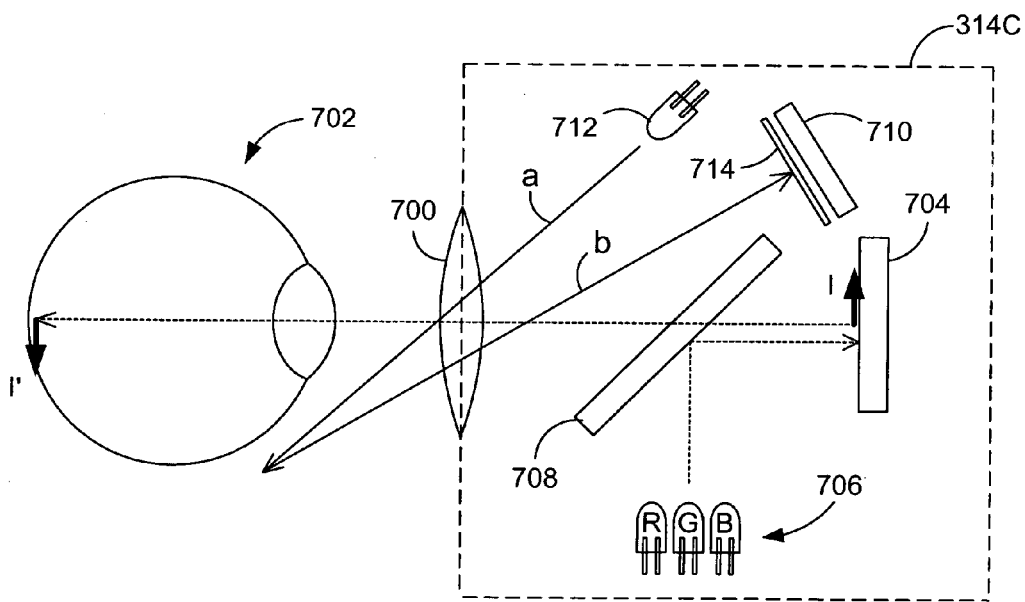
FIG. 7 is a schematic view of a user's eye interacting with a third embodiment of a viewfinder of the device shown in FIGS. 1–3.

FIG. 7 illustrates a third embodiment of an electronic viewfinder 314C that can be incorporated into the camera 100. The viewfinder 314C is similar in some respects to the viewfinder 314B of FIG. 6. Therefore, the viewfinder 314C includes a magnifying lens 700 that is brought near the user's eye 702, a microdisplay 704, a group of LEDs 706, a beam splitter 708, and an eye-start sensor 710. Furthermore, the viewfinder 314C includes an infrared LED 712 and an IR-pass filter 714 that is used to filter visible light before it reaches the eye-start sensor 710. However, in the embodiment of FIG. 7, the IR LED 712, the eye-start sensor 710, and the IR-pass filter 714 are oriented at an oblique angle relative to the microdisplay 704 so as to specifically target the flesh that surrounds the user's eye 702. Therefore, operation is similar as with the embodiment of FIG. 6, except that the eye-start system detects the user's eyelid, cheek, or brow instead of the eye alone. Accordingly, light from the IR LED 712 travels directly along path "a," through the magnifying lens 700, reflects off of the user's face and travels along path "b," passes back through the magnifying lens, through the IR-pass filter 714, and is received by the sensor 710. Although the reflected light will experience significant aberration due to the oblique angle, this aberration does not adversely affect the proximity determination in that gross light signals are being detected.

Figure 8A:
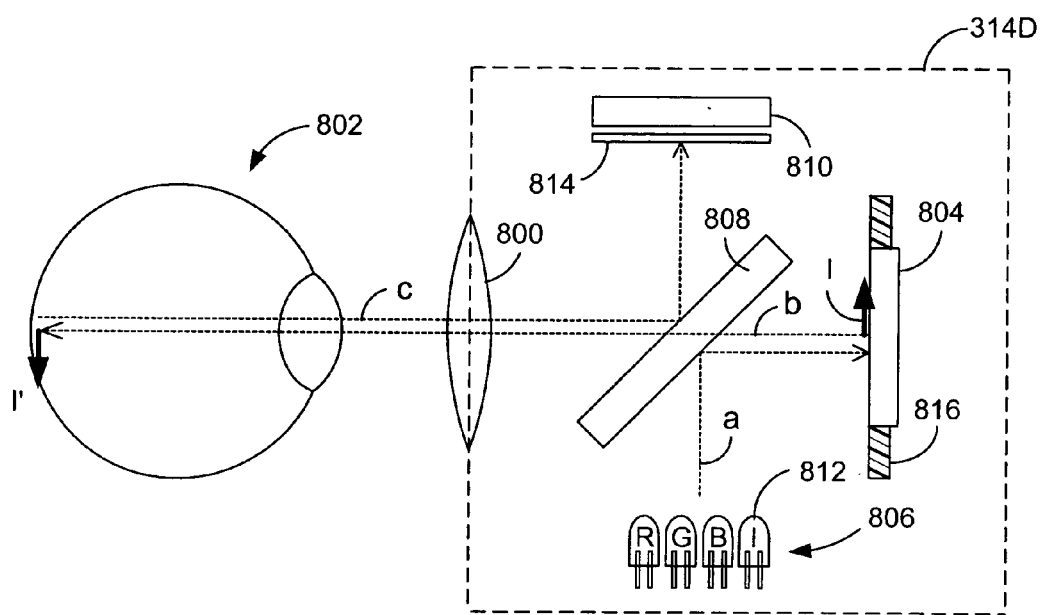
FIG. 8A is a schematic view of a user's eye interacting with a fourth embodiment of a viewfinder of the device shown in FIGS. 1–3.
Figure 8B:
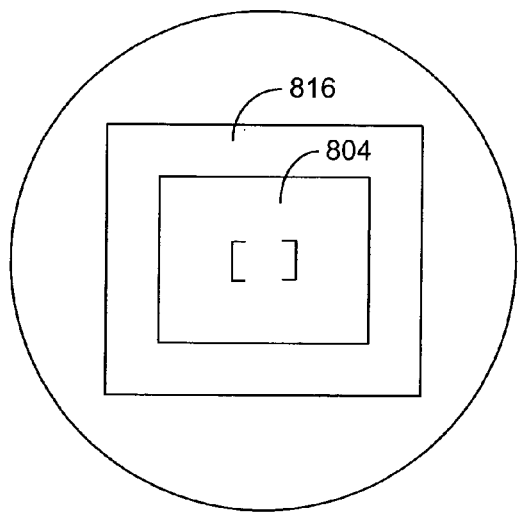
FIG. 8B is a schematic view of the view seen by a user when looking into the viewfinder represented in FIG. 8A.

FIGS. 8A and 8B illustrate a fourth embodiment of an electronic viewfinder 314D that can be incorporated into the camera 100. The viewfinder 314D is similar to the viewfinder 314B of FIG. 6. Therefore, the viewfinder 314D includes a magnifying lens 800 that is brought near the user's eye 802, a microdisplay 804, a group of LEDs 806 which includes an IR LED 812, a beam splitter 808, an eye-start sensor 810, and an IR-pass filter 814. The embodiment of FIGS. 8A and 8B, however, further includes an IR-reflective bezel or reticule 816 that surrounds part or all of the microdisplay 804. This bezel 816 provides a broader field of illumination such that light from the IR LED 812 may more easily be directed toward the user's eye 802. Although the bezel 816 reflects IR light, it absorbs visible light such that visible light from the microdisplay 804 will not be reflected and the bezel will be unobtrusive or invisible to the user. FIG. 8B provides a depiction of one embodiment of the bezel 816 as viewed through the view window 124 of the viewfinder 122. In this embodiment, the bezel 816 completely surrounds the microdisplay 804.

While particular embodiments of the invention have been disclosed in detail in the foregoing description and drawings for purposes of example, it will be understood by those skilled in the art that variations and modifications thereof can be made without departing from the scope of the invention as set forth in the following claims.

Various programs (software and/or firmware) have been identified above. These programs can be stored on any computer-readable medium for use by or in connection with any computer-related system or method. In the context of this document, a computer-readable medium is an electronic, magnetic, optical, or other physical device or means that can contain or store programs for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The term "computer-readable medium" encompasses any means that can store, communicate, propagate, or transport the code for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable media include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

What is claimed is:

1. An eye-start system, comprising:
an infrared light source adapted to be housed within a viewfinder of a device;
a reflective microdisplay also adapted to be housed within the device viewfinder, the microdisplay being configured to reflect infrared light generated by the infrared light source toward a user looking into the viewfinder;
a light sensor also adapted to be housed within the device viewfinder, the light sensor being configured to sense infrared light that reflects off of the user; and
a detection algorithm configured to detect when the user is looking into the viewfinder from the reflected light sensed by the sensor and, in response to such detection, initiate a device action, such that mere proximity of the user to the viewfinder initiates the action.

2. The system of claim 1, further comprising colored light sources that illuminate the microdisplay.

3. The system of claim 1, further comprising an infrared-pass filter that is configured to filter visible light so that visible light does not reach the light sensor.

4. The system of claim 1, wherein the detection algorithm is an eye detection algorithm stored on a computer-readable medium, the eye detection algorithm being configured to make a positive determination of eye proximity when a threshold light level is sensed by the light sensor.

5. The system of claim 1, wherein the device action is initiated without the need to determine a direction in which the user is looking.

6. The system of claim 1, wherein the device action is one of autofocusing, autoexposing, or automatic white balancing.

7. The system of claim 1, wherein the device action is one of autofocusing, autoexposing, or automatic white balancing.

8. An electrical device, comprising:
a viewfinder;
a processor;
a memory; and
an eye-start system that includes an infrared light source, a reflective display, and a light sensor each housed within the viewfinder, the light sensor being configured to sense infrared light that is generated by the infrared light source and reflected off of the reflective display and then a user looking into the viewfinder, the eye-start system further including a detection algorithm configured to detect when the user is looking into the viewfinder from the reflected light sensed by the sensor and, in response to such detection, initiate a device action, such that mere proximity of the user to the viewfinder initiates the action.

9. The device of claim 8, wherein the eye-start system further comprises colored light sources contained within the viewfinder.

10. The device of claim 8, further comprising an infrared-pass filter positioned within the viewfinder so as to be located between the user and the light sensor, the filter being configured to filter visible light so that visible light does not reach the light sensor.

11. The device of claim 8, wherein the detection algorithm is an eye detection algorithm stored within the device memory, the eye detection algorithm being configured to make eye proximity determinations from light signals sensed by the light sensor.

12. The device of claim 8, wherein the device action is initiated without the need to determine a direction in which the user is looking.

13. A digital camera, comprising:
a lens system that receives images of a scene to be captured by the digital camera;
an image sensor that senses light signals transmitted to it by the lens system;
a processor that processes the light signals;
an electronic viewfinder that houses a reflective microdisplay, colored and infrared light sources that illuminate the microdisplay, a light sensor configured to sense infrared light generated by the infrared light source and reflected off of the reflective microdisplay and then off of a user when the user looks into the viewfinder, and an infrared-pass filter that prevents visible light from reaching the sensor; and
a memory that comprises an eye detection algorithm that is used to determine, from light signals sensed by the light sensor, whether the user is looking into the viewfinder such that when mere looking into the viewfinder is detected, a camera action is initiated.

14. The camera of claim 13, wherein the camera action is initiated without the need to determine a direction in which the user is looking.

15. The system of claim 13, wherein the camera action is one of autofocusing, autoexposing, or automatic white balancing.

16. An electronic viewfinder for use in an electrical device, comprising:
a reflective microdisplay for displaying images within the viewfinder;
a magnifying lens for magnifying the images displayed by the microdisplay so that they may be viewed by a user;
at least one light source that illuminates the microdisplay, the at least one light source comprising visible light emitting diodes and an infrared emitting diode; and
an eye-start sensor that is configured to sense infrared light generated by the infrared emitting diode and reflected off of the reflective microdisplay and then the user when the user first looks into the viewfinder, wherein when user proximity is sensed an action of the electrical device is activated.

17. The viewfinder of claim 16, further comprising an infrared-pass filter that filters visible light before it reaches the light sensor.

18. The viewfinder of claim 17, further comprising a beam splitter that directs light reflected off of the user toward the light sensor.

19. The viewfinder of claim 17, further comprising an infrared-reflecting bezel that surrounds the microdisplay and that is configured to reflect infrared light toward the user.

20. The viewfinder of claim 16, wherein the infrared light emitting diode is positioned within the viewfinder so as to directly illuminate the user and wherein the light sensor is positioned within the viewfinder so as to directly receive light reflected off the user.

21. The viewfinder of claim 16, wherein the action of the electrical device is initiated without the need to determine a direction in which the user is looking.

22. The viewfinder of claim 16, wherein the action of the electrical device is one of autofocusing, autoexposing, or automatic white balancing.

23. A method for detecting a user looking into a viewfinder of an electronic device, comprising:
illuminating the user with infrared light generated by a light source housed within the viewfinder and reflected toward the user with a reflective microdisplay also housed within the viewfinder;
sensing, from within the viewfinder, infrared light that reflects off of the user in response to the user being illuminated; and
detecting when the user is looking into the viewfinder from the reflected infrared light sensed by the sensor and, in response to such detection, initiating a device action, such that mere proximity of the user to the viewfinder initiates the action.

24. The method of claim 23, wherein the device action is initiated without the need to determine a direction in which the user is looking.

25. The method of claim 23, wherein the device action is one of autofocusing, autoexposing, or automatic white balancing.

* * * * *

UNITED STATES PATENT AND TRADEMARK OFFICE
CERTIFICATE OF CORRECTION

PATENT NO.       : 7,167,201 B2                                              Page 1 of 1
APPLICATION NO.  : 10/424876
DATED            : January 23, 2007
INVENTOR(S)      : Donald J. Stavely et al.

It is certified that error appears in the above-identified patent and that said Letters Patent is hereby corrected as shown below:

In column 10, line 18, in claim 20, after "off" insert -- of --.

Signed and Sealed this

Twenty-eighth Day of April, 2009

JOHN DOLL
*Acting Director of the United States Patent and Trademark Office*